United States Patent
Kumagai

(10) Patent No.: US 8,023,603 B2
(45) Date of Patent: Sep. 20, 2011

(54) INTERFACE CIRCUIT INCLUDING A SHIFT CLOCK GENERATOR TO GENERATE A SHIFT CLOCK HAVING DIFFERENT CYCLES ACCORDING TO DATA SEQUENCE OF DATA STRING

(75) Inventor: Toshiyuki Kumagai, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 945 days.

(21) Appl. No.: 11/730,685

(22) Filed: Apr. 3, 2007

(65) Prior Publication Data

US 2007/0241947 A1 Oct. 18, 2007

(30) Foreign Application Priority Data

Apr. 4, 2006 (JP) .................................. 2006-103546

(51) Int. Cl.
*H04L 7/00* (2006.01)
*H03M 7/34* (2006.01)
(52) U.S. Cl. ......................................... 375/354; 341/51
(58) Field of Classification Search .................. 375/373, 375/371, 354; 341/51
See application file for complete search history.

(56) References Cited

U.S. PATENT DOCUMENTS

| 2002/0116667 A1* | 8/2002 | McEwen et al. ................. 714/39 |
| 2005/0258949 A1* | 11/2005 | Iwazumi ........................ 340/442 |
| 2006/0023825 A1* | 2/2006 | Kato et al. ..................... 375/372 |

FOREIGN PATENT DOCUMENTS

| JP | 10-164148 (A) | 6/1998 |
| JP | 10-167009 | 6/1998 |
| JP | 10-247903 (A) | 9/1998 |
| JP | 11-250008 (A) | 9/1999 |

OTHER PUBLICATIONS

Japanese Office Action dated May 17, 2011, with English translation.

* cited by examiner

*Primary Examiner* — Dac Ha
*Assistant Examiner* — Brian J Stevens
(74) *Attorney, Agent, or Firm* — McGinn Intellectual Property Law Group, PLLC

(57) ABSTRACT

An interface circuit includes a detector to detect a particular pattern from a sequence of output data, a shift clock generator to change a cycle of a shift clock according to the detection result, a shift register section to change a data output width by the shift clock and output it as drive data, and an open-drain output section including an N-channel transistor driven by the drive data and a pull-up resistor. The detector detects a sequence where the current output data is "0" and the next output data is "1", and the shift clock generator shortens and extends the cycles of the shift clock corresponding to "0" and "1", respectively.

10 Claims, 8 Drawing Sheets

INTERFACE CIRCUIT INCLUDING A SHIFT CLOCK GENERATOR TO GENERATE A SHIFT CLOCK HAVING DIFFERENT CYCLES ACCORDING TO DATA SEQUENCE OF DATA STRING

BACKGROUND OF THE INVENTION

1. Field of the Invention

The present invention relates to an interface circuit including an open-drain or open-collector transistor.

2. Description of Related Art

FIG. 7 shows an example of a serial interface circuit according to a related art. The serial interface circuit 201 includes a shift register section 210 that receives data in parallel format through an internal bus and outputs the data in serial format to a receiving end, and a baud rate generator 220 that supplies a shift clock to the shift register section 210.

During data transmission, the shift register section 210 receives data in parallel format from a controller (Central Processing Unit or CPU) or the like through an internal bus and outputs the data in serial format through an input/output terminal 216. During data reception, the shift register section 210 receives data in serial format from a receiving end through the input/output terminal 216 and an input buffer 219 and sends the data in parallel format to the CPU. The shift register section 210 includes 8-bit shift registers b0 to b7, for example, and outputs 8-bit serial data each time. The output of the shift register section 210 is connected to the gate of an N-channel transistor 215a of an output section 215 through an inverter 214. The drain of the N-channel transistor 215a is connected to the input/output terminal 216. Thus, the output section 215 has an open-drain configuration.

The input/output terminal 216 is connected to a bus line 217 and further connected to another serial interface circuit (not shown) through the bus line 217. If any of serial interface circuits that are connected to the bus line 217 does not output Low level, the voltage of the bus line 217 is pulled up to a power supply voltage through a pull-up resistor 218.

The baud rate generator 220 receives a basic clock and generates a shift clock at a prescribed frequency (baud rate) The baud rate generator 220 includes a counter 221, a comparator 222 and a ½ frequency divider 223. The baud rate generator 220 counts a basic clock by the counter 221, supplies a clock to the ½ frequency divider 223 at the timing corresponding to a set value of the comparator 222, and outputs a ½ frequency-divided clock as a shift clock. In accordance with the ½ frequency-divided shift clock, shift registers 211 of the shift register section 210 sequentially output data in serial format.

FIG. 8 is a waveform chart of the serial interface circuit. A shift clock having a constant cycle T0 is generated by the baud rate generator, and the data stored in each shift register is output in synchronization with the shift clock. Because the output section 215 has an open-drain configuration, the waveform of data output at a transmitting end is slightly rounded when outputting a High-level signal.

At a receiving end, the output from transmitting end is evaluated with respect to a prescribed threshold level and thereby converted into a pulse signal as shown in the determination result at the receiving end in FIG. 8. However, although the cycle of the shift clock at the transmitting end is constant at T0, the data line is less apt to become High level due to pull-up resistance and therefore the rising edge of the High-level signal is rounded as shown in FIG. 8, which causes the data rate in the receiving-end determination result to appear not to have a constant width. Specifically, the period of Low level before shifting to High level is T2 that is longer than the original cycle T0, and the period of High level after shifting from Low level is T1 that is shorter than the original cycle T0.

A receiver for remote control (which is referred to hereinafter simply as a receiver) with an aim to prevent an error due to a change in pulse width during data exchange with a transmitting end is disclosed in Japanese Unexamined Patent Application Publication No. 10-167009 (Yamamoto). The receiver determines if a bit is "0" or "1" based on a difference in pulse width between High level and Low level. Specifically, it evaluates a received signal with respect to a set value that is set to be narrower or wider than a predetermined pulse width, thereby enabling the bit decision even when a pulse width has changed.

However, the technique taught by Yamamoto needs to add a function for enabling accurate decision even with a changed pulse width to a receiving end, and it is necessary to add the function to each receiving device if there are a large number of receiving devices to receive data from a transmitting end, which causes an increase in system size and costs. Further, because the technique corrects a received signal from the transmitting end by estimating a change, it sometimes fails to provide accurate decision depending on the degree of change. It thus sometimes fails to ensure a desired decision accuracy because it is a system to provide accurate decision based on a change that has already occurred.

Furthermore, because the period of High level at the receiving end is shortened in the open-drain output as described above, it hampers the high-speed transmission. An increase in transmission speed causes failure to transmit a High-level signal to the receiving end, in which case it is difficult to make a correction at the receiving end.

SUMMARY OF THE INVENTION

According to one aspect of the present invention, there is provided an interface circuit including a shift clock generator to generate a shift clock having different cycles according to a data sequence of a data string, a data holding circuit to hold the data string and serially output the data string in response to the shift clock, and a transistor to drive a bus line upon receiving an output of the data holding circuit.

The present invention changes the cycle of a shift clock according to the sequence of a data string and outputs the data string in synchronization with the shift clock to thereby change a data width of output data according to the sequence of the output data.

The present invention enables a transmitting end to perform data output that is corrected in accordance with transmission status and a receiving end, thereby receiving data accurately. It only needs to add a function to output corrected data to the transmitting end only, thereby simplifying a system.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

An exemplary embodiment of the present invention is described hereinafter in detail with reference to the drawings. In the below-described embodiment, the present invention is applied to a serial interface circuit with open-drain output. Although a serial interface circuit is used in the following description of the embodiment, the present invention may be also applied to a parallel output circuit. Further, although the circuit has an open-drain output in the following description of the embodiment, it may have an open-collector output.

Figure 1:
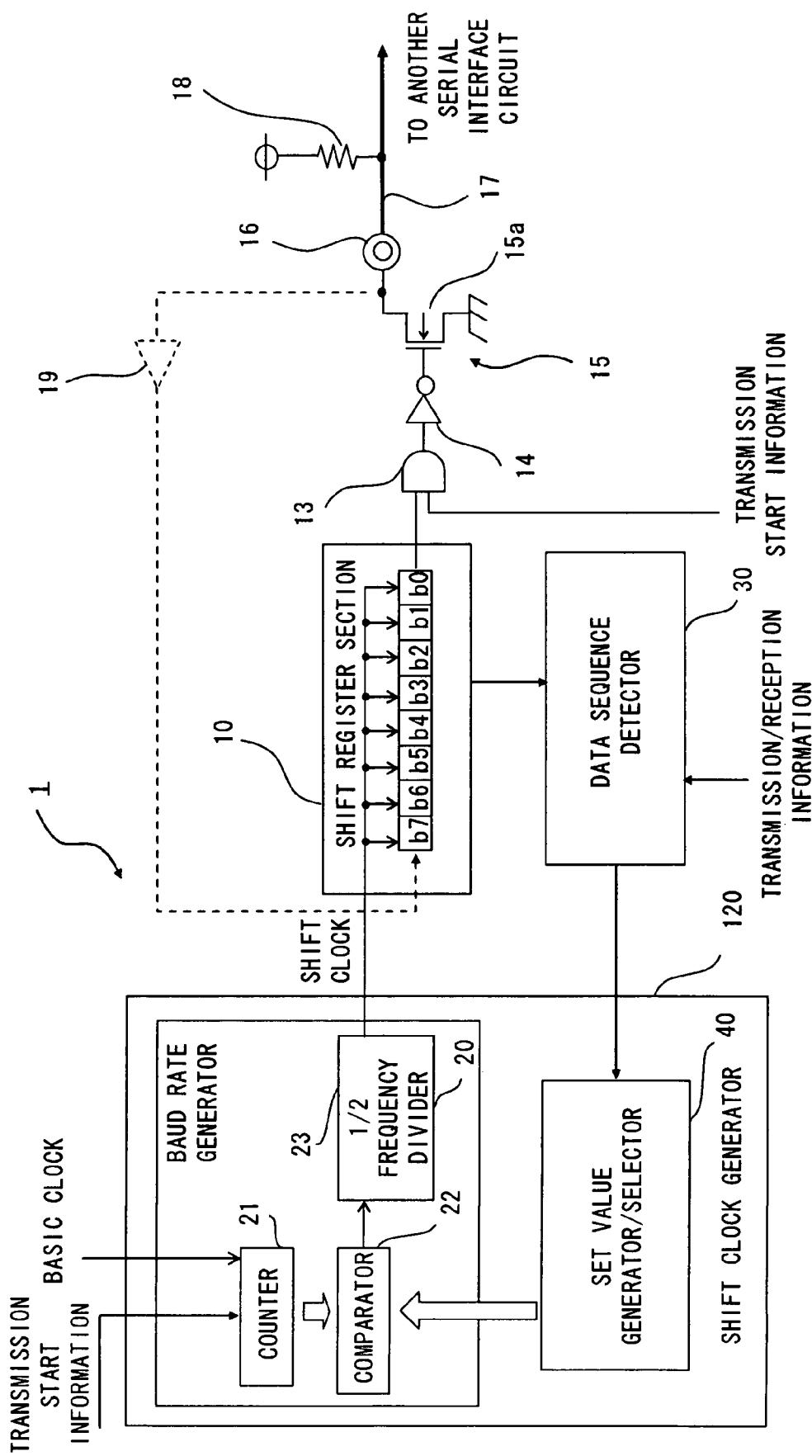
FIG. 1 is a view showing a serial interface circuit according to an embodiment of the present invention.

FIG. 1 is a view showing a serial interface circuit according to an embodiment of the present invention. The serial interface circuit 1 of this embodiment has an open-drain configuration that generates and outputs a data signal synchronous with a shift clock. Various data are input to shift registers b0 to b7 in a shift register section 10 through a CPU and a bus, which are not shown. The serial interface circuit 1 changes the cycle (frequency) of a shift clock according to the sequence of data stored in the shift registers b0 to b7 to thereby change a data output width.

As shown in FIG. 1, the serial interface circuit 1 includes a data sequence detector 30, a shift clock generator 120, a shift resister section 10, and an output section 15 with the open-drain configuration. The data sequence detector 30 detects a particular pattern from a time-series sequence of output data. The shift clock generator 120 generates a shift clock with a cycle changed (corrected) according to the detection result. The shift resister section 10 outputs data as drive data in response to the shift clock that is generated by the shift clock generator 120. The output section 15 generates a transmission signal from the data output of the shift register section 10. The serial interface circuit 1 has the configuration in which the data sequence detector 30 and a set value generator/selector 40 are added to the known configuration including an output circuit, a shift register section, and a baud rate generator.

The shift register section 10 is composed of 8-bit shift registers, for example, and the data transmitted from a CPU through a bus are stored in units of 8 bits and then output in serial format in units of 8 bits to the output section 15. The configuration of the shift register section 10 is not limited thereto, and it may be a 16-bit shift register. Although the interface circuit 1 of FIG. 1 uses eight shift registers b0 to b7 that store the 0th bit to the 7th bit, it is possible to add a shift register SB for a start bit in the previous stage of the shift register b0, and also to add a shift register EB for a stop bit (end bit) in the subsequent stage of the shift register b7, as described later.

The shift register section 10 is connected to the output section 15 through an AND circuit 13 and an inverter 14. Transmission start information is input to one input of the AND circuit 13. The transmission start information is supplied from a CPU (not shown) to give a notice when the serial interface circuit 1 starts the transmission. Specifically, "1" is input upon the start of transmission, so that the output from the shift register section 10 is transmitted to the output section 15 through the inverter 14. The output section 15 has an open-drain output, and the drain of an N-channel MOS transistor 15a is connected to an input/output terminal 16. Although the N-channel MOS transistor is used in this embodiment, it is possible to use a bipolar transistor and an open-collector configuration instead.

The input/output terminal 16 is connected to a bus line 17 and further connected to another serial interface circuit (not shown) through the bus line 17. A power supply voltage is applied to the bus line 17 through a pull-up resistor 18. If any of serial interface circuits that are connected to the bus line 17 does not output Low level, the voltage of the bus line 17 is pulled up to the power supply voltage through the pull-up resistor 18. Further, the input/output terminal 16 is connected the serial input of the shift register section 10 through an input buffer 19. The shift register section 10 outputs in parallel the data that is received in serial format through the input/output terminal 16. Although the interface circuit 1 of this embodiment has the input/output terminal 16, it may have an input terminal and an output terminal separately.

The data sequence detector 30 refers to the data stored in the shift register section 10 and detects a data sequence (particular pattern) that the current output is "0" and the next output is "1". Although the detailed operation is described later, the output of the output section 15 is such that it falls from High level to Low level quickly but rises from Low level to High level gradually. Therefore, the shift clock generator 120, which is detailed later, changes the cycle of the shift clock in the period during which the level shifts from Low to High so as to extend the shift clock cycle corresponding to High level and to proportionately shorten the shift clock cycle corresponding to Low level prior to shifting to the High level. Specifically, the shift clock generator 120 generates the shift clocks having different cycles in accordance with the data sequence. Thus, the data sequence detector 30 detects such a period (which is referred to hereinafter as a correction target period) by detecting the data sequence in which the current data is "0" and the next data is "1".

The shift clock generator 120 includes the set value generator/selector 40 and a baud rate generator 20. The baud rate generator 20 receives a basic clock and generates a shift clock at a prescribed frequency (baud rate). The baud rate generator 20 includes a counter 21, a comparator 22 and a ½ frequency divider 23. The baud rate generator 20 counts a basic clock by the counter 21, supplies a clock to the ½ frequency divider 23 at the timing corresponding to a set value of the comparator 22, and outputs a ½ frequency-divided clock as a shift clock. The configuration of the baud rate generator 20 is not limited thereto as long as it can generate a shift clock at a prescribed frequency from a basic clock.

The shift clock generator 120 changes the cycle of the shift clock in the above-described correction target period. The data sequence detector 30 detects the correction target period and sends a notice to the set value generator/selector 40. In response to this notice, the set value generator/selector 40 generates or selects a set value to the comparator 22 for changing the shift clock and sets the generated or selected set value to the comparator 22.

The shift register section 10 includes 8-bit shift registers b0 to b7. The 0th to 7th bits are stored in the shift registers b0 to b7, respectively. The shift register section 10 outputs the data sequentially from the 0th bit in synchronization with the shift clock that is generated in the shift clock generator 120. The shift register section 10, the data sequence detector 30 and the shift clock generator 120 serve as a driver to drive the output section 15.

The serial interface circuit 1 of this embodiment is an input/output circuit capable of inputting and outputting data through the input/output terminal 16, which allows a receiving end to receive data correctly by correcting the width of data in a particular pattern at the time of transmission. Thus, the key feature of the serial interface circuit 1 is its output operation and therefore the following description focuses on the output operation (transmission operation).

Figure 2:
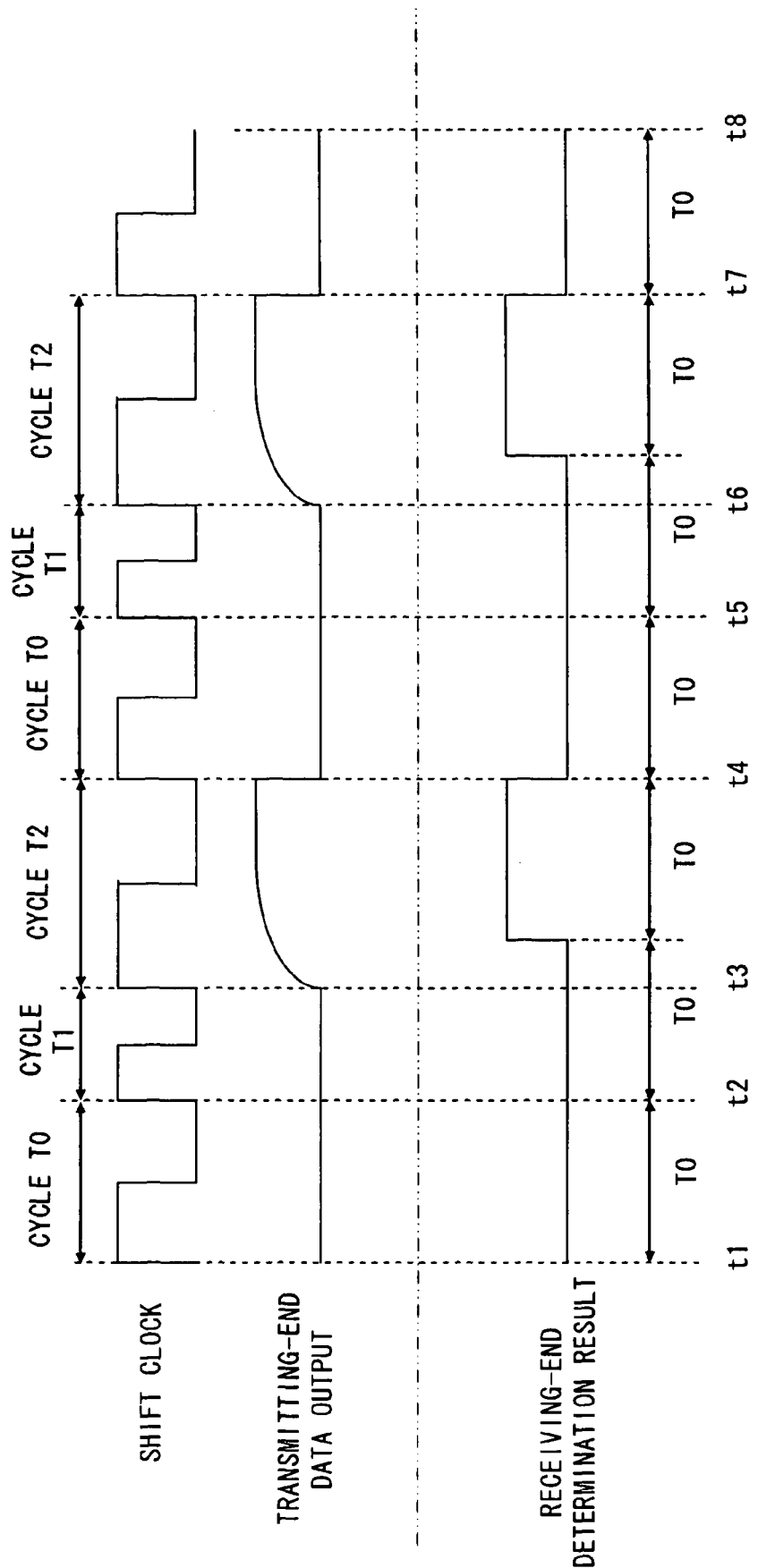
FIG. 2 is a view to explain the output waveform that is output from a serial interface circuit according to an embodiment of the present invention.

FIG. 2 is a view to explain the output waveform that is output from the serial interface circuit according to this embodiment. The data sequence detector 30 detects the period during which the current data is "0" and the subsequent data is "1" as a correction target period. Upon detection of the correction target period, the shift clock generator 120 sets the cycle of the shift clock when outputting the data "0" to T1 and the cycle of the shift clock when outputting the data "1" to T2 during this period as shown in FIG. 2. The cycle T1 is shorter than the normal cycle T0, and the cycle T2 is longer than the normal cycle T0. The output data that is output based on such a shift clock is as shown in the transmitting-end data output. Specifically, the period of High level after Low level is extended and the period of the Low level is shortened correspondingly. The output data is evaluated with respect to a prescribed threshold level at the receiving end to thereby obtain a pulse signal at regular intervals of T0 as shown in the receiving-end determination result.

In this way, this embodiment detects the state where the current data output value is Low level and the next data output value is High level in advance and then counts the number of basic clock cycles for the shift clock corresponding to the Low-level period and the High-level period to determine the cycle (time period) of the shift clock so as to shorten the present Low-level output period and extend the subsequent High-level output period.

The operation to generate a shift clock in the shift clock generator 120 shown in FIG. 1 is described hereinafter. In the following, the case where the shift clock is made up of 16 cycles of the basic clock and the cycle of the shift clock is extended or shortened (i.e. corrected) by the correction amount of 6 cycles of the basic clock is described by way of illustration. As shown in FIG. 2, the shift clock generator 120 normally generates a shift clock having the cycle T0 that corresponds to 16 cycles of the basic clock as shown in the timings t1 to t2 and t4 to t5. Upon detection of the correction target period, the set value generator/selector 40 sets the Low-level output period to the length corresponding to 10 cycles of the basic clock by shortening the period by the above-described correction amount (the timings t2 to t3 and t5 to t6 in FIG. 2; the cycle T1). In such a case, a set value "10" is set to the comparator 22 so that a clock (shift clock) is output at the timing when the basic clock is counted to 10. Then, the set value generator/selector 40 sets the following High-level output period to the length corresponding to 22 cycles of the basic clock by extending the period by the above-described correction amount (the timings t3 to t4 and t6 to t7 in FIG. 2; the cycle T2). In such a case, a set value "22" is set to the comparator 22 so that a shift clock is output at the timing when the basic clock is counted to 22.

As described above, the shift clock having different cycles is generated during the correction target period. If, for example, the data "0" is output in the timing t2 to t3 and the data "1" is output in the next timing t3 to t4, the rising edge of the data "1" is rounded. If this data is evaluated with respect to a threshold level at the receiving end, the data width is determined to be shorter than the cycle T2 in the timing t3 to t4. On this account, this embodiment makes a correction to the shift clock cycle by setting the cycle T2 to be longer than the normal cycle T0, so that the data width of the data "1" is determined to be the cycle T0 as a result of the evaluation with respect to a threshold level at the receiving end, thereby enabling accurate data output.

Although the shift clock corresponds to 16 cycles of the basic clock in the above-described embodiment to simplify the description, the number of cycles of the basic clock corresponding to one shift clock is not limited thereto, and it may be 256 or the like. Further, although the cycle of the shift clock is shortened or extended by 6 cycles of the basic clock in the above-described example, the shift clock cycle, which is the degree of extension or shortening (correction amount) of a data output width, may be programmable so that it can be determined in consideration of the transmission conditions, specifications of a receiving end or the like. For example, a correction amount for the set value to the comparator 22 to determine the cycle of the shift clock may be set to the set value generator/selector 40 according to designation from outside.

Figure 3:
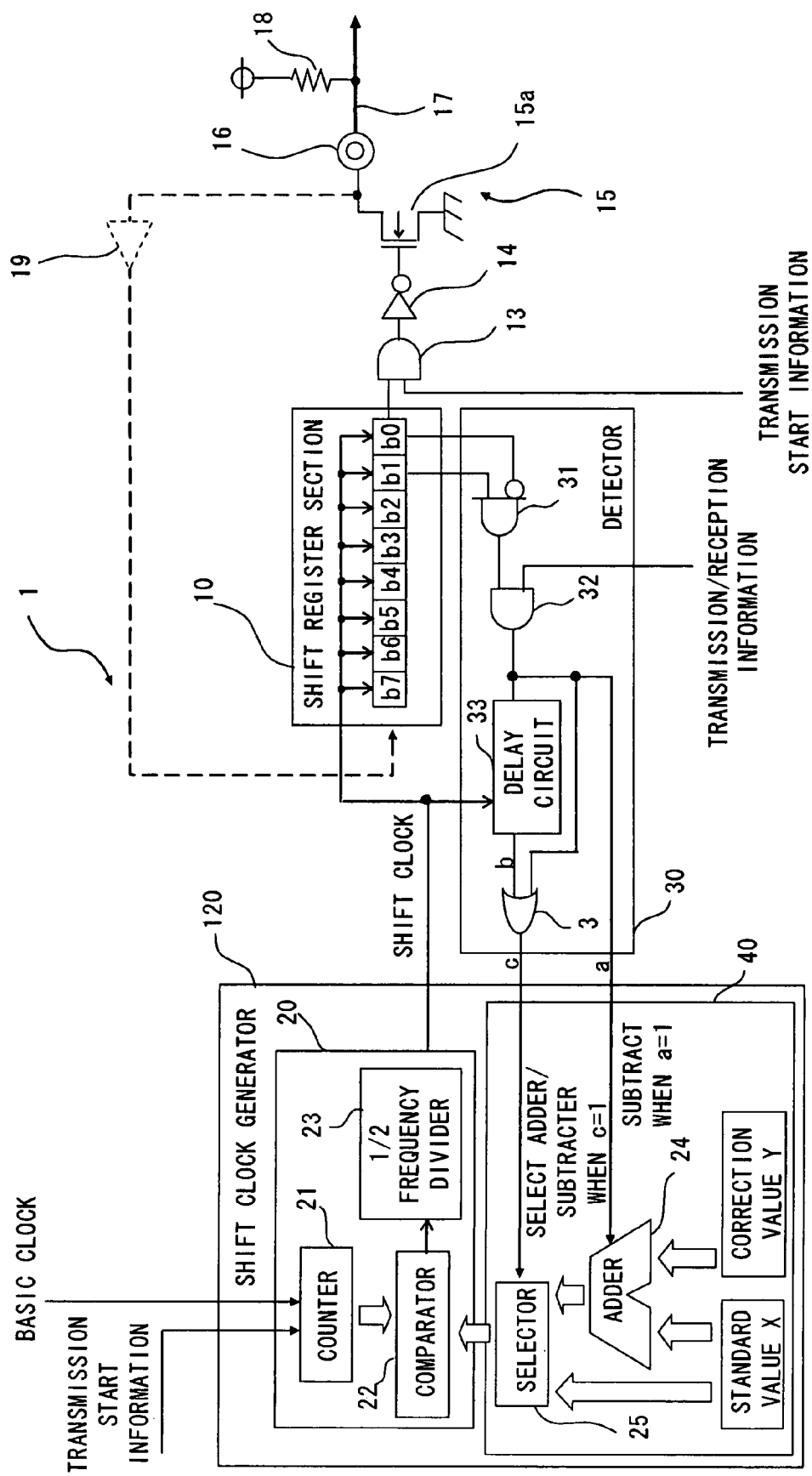
FIG. 3 is a circuit diagram showing a serial interface circuit as a specific example according to an embodiment of the present invention.

The serial interface circuit of this embodiment is described hereinafter in further detail. FIG. 3 is a circuit diagram showing a specific example of the serial interface circuit 1 shown in FIG. 1. The specific configurations of the data sequence detector (which is referred to hereinafter as the detector) 30 and the shift clock generator 120 are illustrated in this specific example. The detector 30 includes AND circuits 31 and 32, a delay circuit 33 and an OR circuit 34.

One input of the AND circuit 31 receives an inverted version of the data stored in the shift register b0 and the other input receives the data stored in the shift register b0. One input of the AND circuit 32 receives the output of the AND circuit 31 and the other input receives transmission/reception information that indicates if the current operation is transmission or reception. The transmission/reception information is also sent from a CPU. The output "a" of the AND circuit 32 is input to the delay circuit 33, one input of the OR circuit 34, and the shift clock generator 120. The other input of the OR circuit 34 receives the output "b" of the delay circuit 33.

The shift clock generator 120 includes the baud rate generator 20 including the counter 21, the comparator 22 and the ½ frequency divider 23, and the set value generator/selector 40 including an adder 24 and a selector 25. The adder 24 receives a standard value X and a correction value Y and subtracts the correction value Y from the standard value X (X−Y) when the output "a" of the AND circuit 32 is "1" and adds the correction value Y to the standard value X (X+Y) when the output "a" is "0", for example. The standard value X indicates the number of basic clock cycles included in the shift clock in normal time (no correction), and the correction value Y indicates a value for shortening or extending the width of the shift clock in normal time, which is designated by the number of basic clock cycles. The adder 24 outputs a result of the addition/subtraction to the selector 25. The selector 25 receives the standard value X and the addition/subtraction result and selectively outputs the output of the adder 24 when the output "c" of the OR circuit 34 is "1" and selectively outputs the standard value X when the output "c" is "0". The selector 25 sets a set value to the comparator 22 according to this value. The counter 21 of the shift clock generator 120 receives transmission start information in the same manner as the AND circuit 13 and counts up the basic clock at the same time as the start of transmission.

Figure 4:
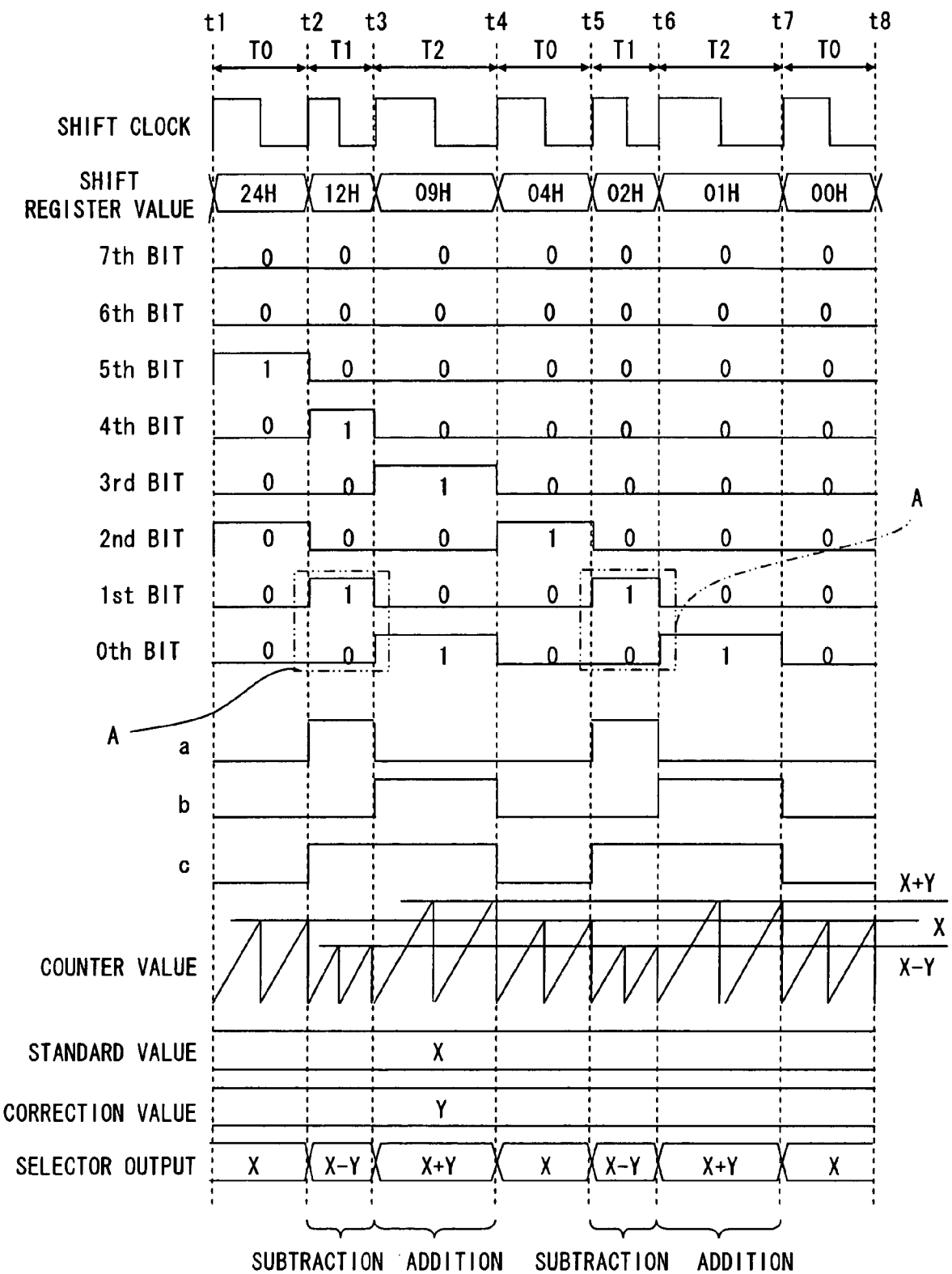
FIG. 4 is a timing chart showing the operation of the serial interface circuit as the specific example.
Figure 5:
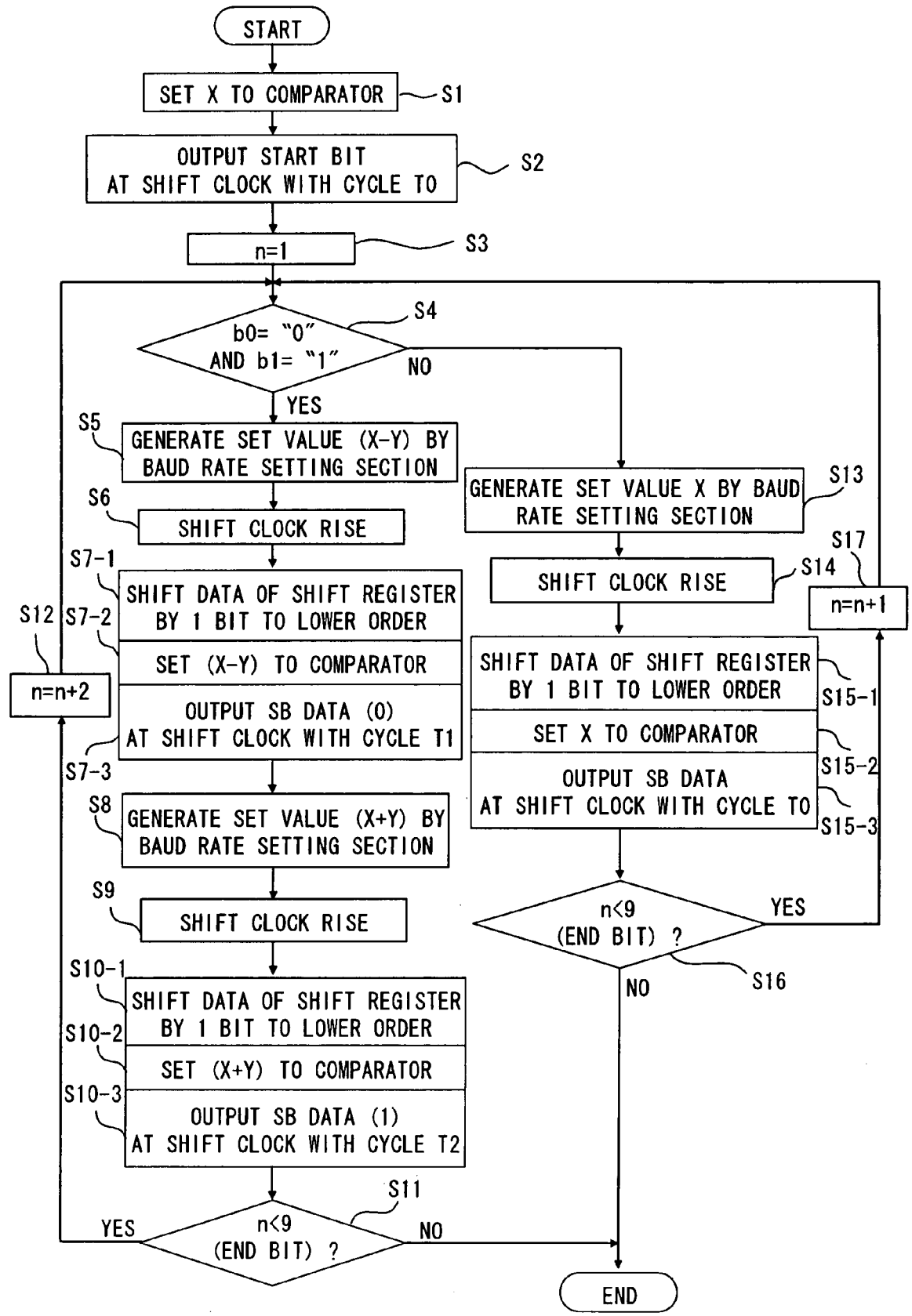
FIG. 5 is a flowchart showing the operation of the serial interface circuit as the specific example.
Figure 6:
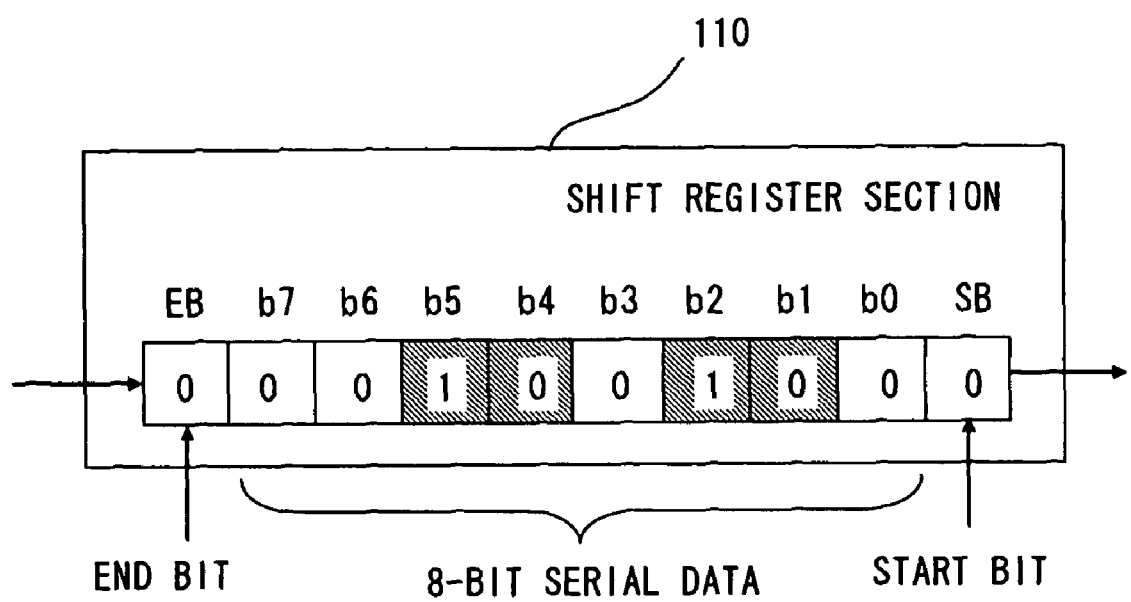
FIG. 6 is a view showing a shift register section including shift registers for a start bit and an end bit.
Figure 7:
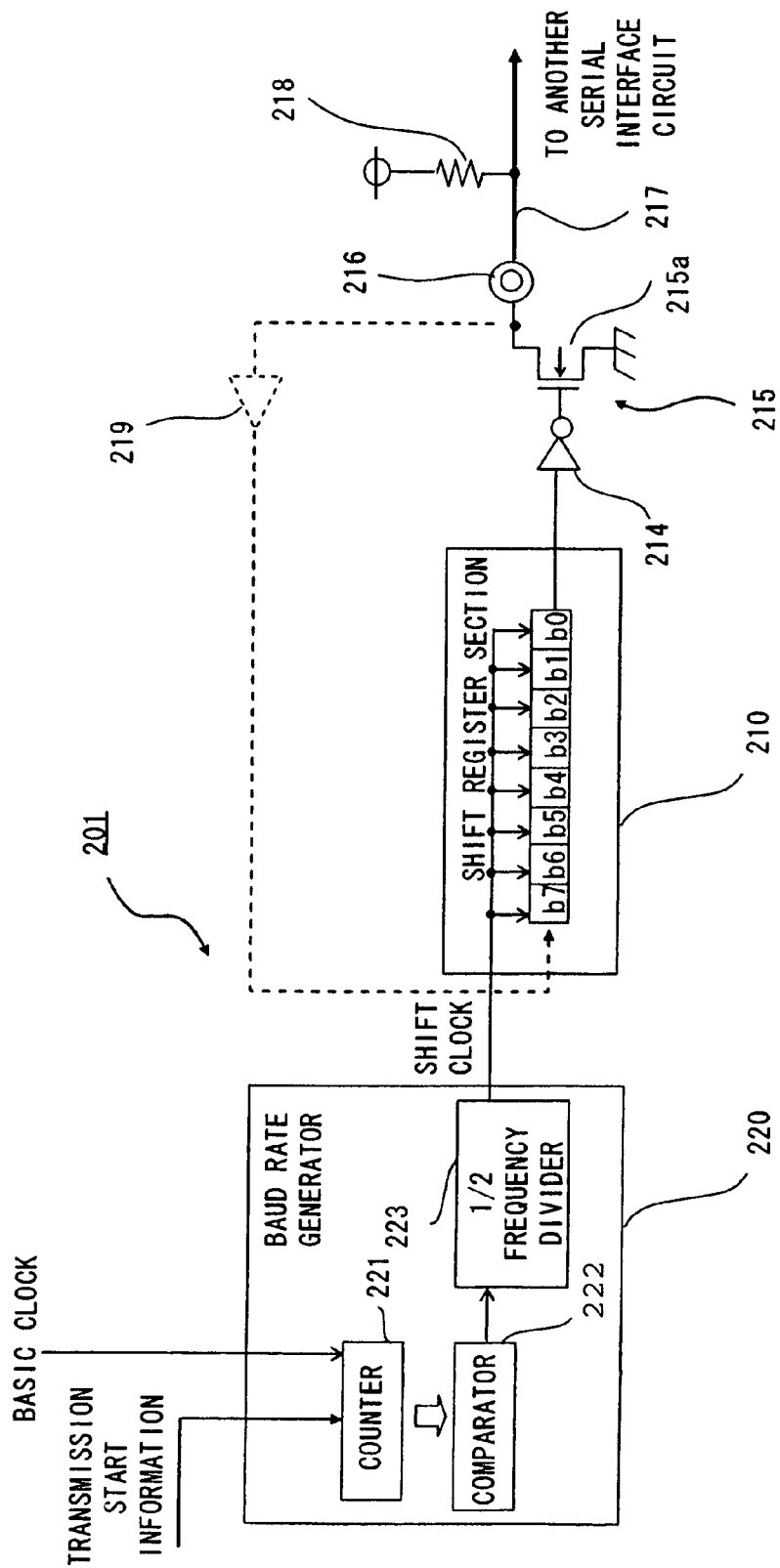
FIG. 7 is a view showing an example of a serial interface circuit according to a related art.
Figure 8:
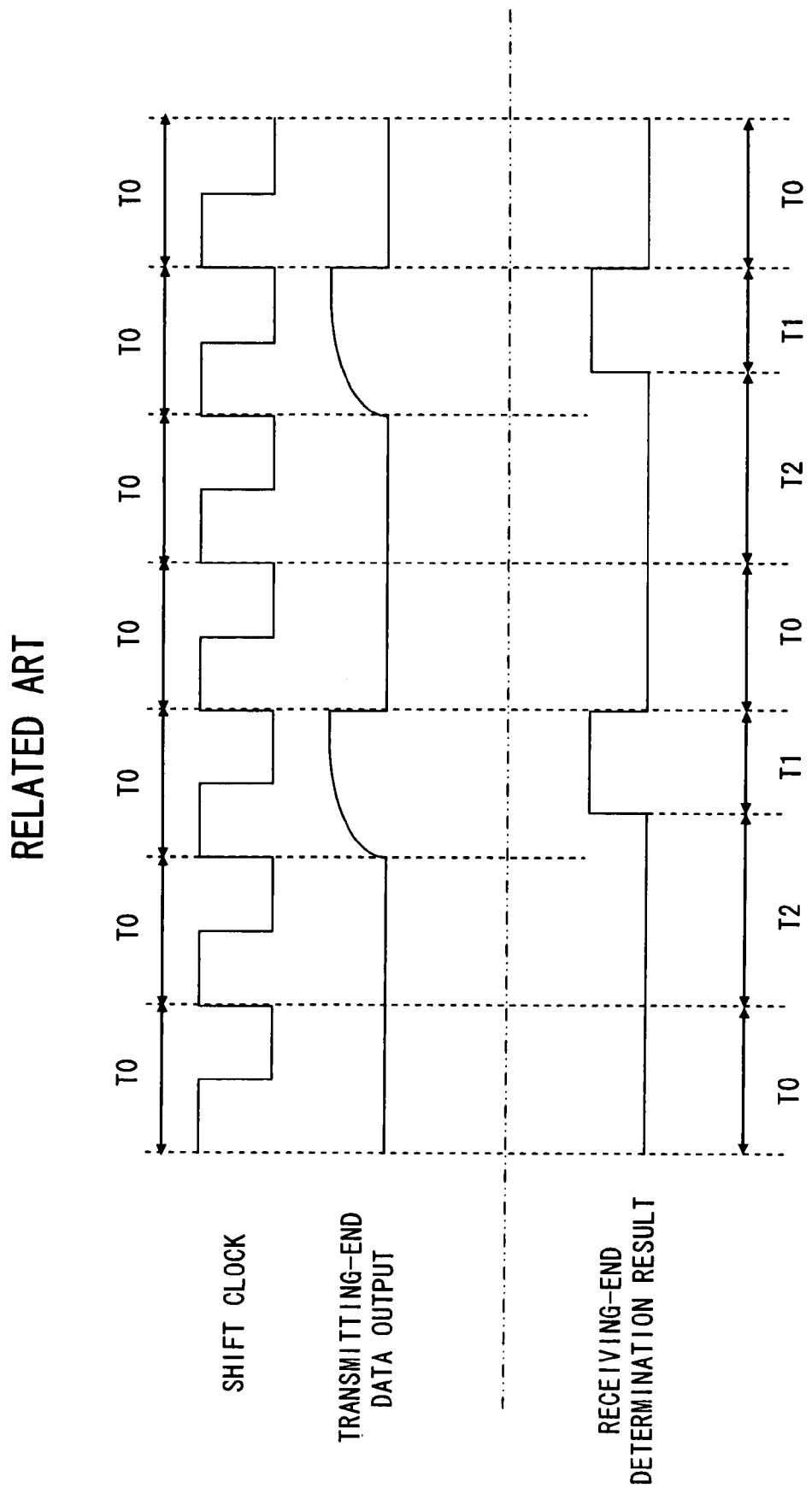
FIG. 8 is a waveform chat of the serial interface circuit according to the related art.

The operation of the serial interface circuit 1 according to this specific example is described hereinafter. FIG. 4 is a timing chart showing the operation of the serial interface circuit 1. FIG. 5 is a flowchart showing the operation of the serial interface circuit 1. The output data normally includes a start bit and an end bit prior and subsequent thereto. As described earlier, the shift register section may be configured like a shift register section 110 shown in FIG. 6. As shown in FIG. 6, the shift register section 110 includes a register SB for a start bit placed in the previous stage of the shift register b0 and a register EB for an end bit placed in the subsequent stage of the shift register b7 in addition to the shift registers b0 to b7 that respectively store the 0th to 7th bits. The operation to output data including the start bit and the end bit is described hereinafter.

In FIG. 4, the 0th to 7th bits indicate the data that are stored in the shift registers b0 to b7 of the shift register section 110. As shown in FIG. 6, the start bit and the end bit are both "0". As an example, the operation to transmit 10-bit data containing 8-bit data of "00100100", a start bit and an end bit is described hereinafter. Specifically, total 10 bits=n, and the data n=0 to 9 that are stored in the register SB are output in the below-described operation.

Referring to FIG. 5, the interface circuit 1 sets a set value X to the comparator 22 (Step S1). According to the set value X, the shift clock generator 120 generates a shift clock having the cycle T0. Then, a start bit is output at the shift clock with the cycle T0 (Step S2). The output of the serial interface circuit 1 is always at High level, and therefore the start of data transmission is notified to the receiving end upon output of the start bit "0" at the start of transmission. The data stored in the register SB is thereby the 0th bit with n=1 (Step S3).

Then, the detector 30 shown in FIG. 3 determines if the value of the shift register b0 is "0" and the value of the shift register b1 is "1" based on the data of the shift registers b0 and b1 (Step S4). If the data do not satisfy b0=0 and b1=1, the set value generator/selector (which is referred to hereinafter also as a baud rate setting section) 40 generates a set value X (Step S13). The baud rate generator 20 can thereby generate a shift clock with a standard width. When the shift clock rises (Step S14; timing t1 in FIG. 4), the data of the shift register is shifted to the lower order by 1 bit (Step S15-1), and the set value X is set to the comparator 22 (Step S15-2). The shift clock having the cycle T0 is thereby generated and the data of the register SB is output at the cycle T0 (Steps S15-3, timing t1-t2 in FIG. 4). If the data stored in the register SB is not an end bit (n<9) (Yes in Step S16), the process returns to Step S4.

In Step S4, if the data stored in the shift registers b0 and b1 both satisfy b0=0 and b1=1 (Yes in Step S4), the baud rate setting section generates a set value (X−Y) (Step S5), shifts the data of the shift register by 1 bit to the lower order at the timing when the shift clock rises (t2 in FIG. 4) (Step S7-1), and sets the set value (X−Y) to the comparator 22 (Step S7-2), so that the data ("0") is output from the register SB at the shift clock with the cycle T1 (Step S7-3).

Then, the baud rate setting section generates a set value (X+Y), shifts the data of the shift register by 1 bit to the lower order at the timing when the shift clock rises (t3 in FIG. 4) (Step S10-1), and sets the set value (X+Y) to the comparator 22 (Step S10-2), so that the data ("1") is output from the register SB at the shift clock with the cycle T2 (Step S10-3).

If the data stored in the register SB is not an end bit (n<9) (Yes in Step S16), the process returns to Step S4. If it is an end bit (n=9), the process ends.

As described above, this embodiment determines whether to correct a standard value X according to the sequence of the current output data (logic level) and the next output data to be output at the subsequent shift clock cycle and changes the length of a shift clock cycle as needed. It is thereby possible to change the width of the data output from the shift register section 10 so as to extend the period of High level that is shifted from Low level.

By changing the cycle of the shift clock corresponding to the width of output data, it is possible by communication protocol to prevent that a data line is less apt to become High level to cause a receiving end to receive data at a non-constant data rate where a data output terminal (output section) is composed of an N-channel open-drain terminal and a pull-up resistor. Further, because the correction value Y is programmable, it is possible to determine the length of a High-level period according to a value depending on transmission conditions and a logic threshold at a receiving end.

The present invention is not limited to the above-described embodiment but may be altered in various ways without departing from the scope of the invention. For example, although an open-drain configuration including a pull-up resistor and an N-channel transistor connected in series between a power supply and a ground is described in the above embodiment, the same effect can be obtained with the use of an open-collector configuration. The pull-up resistor may be added in any ways. Further, it is possible to use a combination of a P-channel transistor and a pull-down resistor.

Further, although the serial interface circuit is described in the above embodiment, the present invention may be applied to a parallel interface circuit. In such a case, a sequence of the current and next output data is detected and a shift clock is generated according thereto.

The detector 30 does not necessarily have the above-described configuration as long as it can detect a time-series sequence of output data or a period (correction target period) during which the level changes from Low to High. Although a correction target period of the shift clock is detected in reference to the data stored in two shift registers in the above-described specific example, it is possible to detect a correction target period of the shift clock in reference to a value of two or more (e.g., three) shift registers. In such a case, if the previous, current and subsequent data are indicated as "000" in chronological order, a set value (X−Y) is set for the current shift clock cycle with the sequences of "001" and "101", and a set value (X+Y) is set for the current shift clock cycle with the sequence of "011".

It is apparent that the present invention is not limited to the above embodiment that may be modified and changed without departing from the scope and spirit of the invention.

What is claimed is:

1. An interface circuit comprising:
   a shift clock generator to generate a shift clock having different cycles according to a data sequence of a data string;
   a data holding circuit to hold the data string and serially output the data string in response to the shift clock;
   a transistor to drive a bus line upon receiving an output of the data holding circuit; and
   a detector to detect the data sequence of the data string,
   wherein the shift clock generator changes a cycle of the shift clock based on a detection result of the detector, and wherein:

the data string comprises a first data string of a bits (n>I) the shift clock comprises a first shift clock, the data string further comprises a second data string of n bits, the second data string being different from the first data string, the shift clock generator generates a second shift clock according to a data sequence of the second data string, a cycle of the first shift clock is different from a cycle of the second shift clock the first data string includes a specific data sequence of 2 bits, and the second data string does not include the specific data sequence.

2. The interface circuit according to claim 1, wherein the detector detects a particular pattern of the data sequence as a correction target period, and the shift clock generator changes a cycle of a shift clock in the correction target period.

3. The interface circuit according to claim 2, wherein the shift clock generator comprises:

a generator to generate a shift clock having a desired cycle by counting a basic clock according to a set value; and a setting section to set the set value generated by the generator, wherein the setting section changes the set value in the correction target period.

4. The interface circuit according to claim 3, wherein the set value set by the setting section is programmable.

5. The interface circuit according to claim 1, wherein the detector detects a period where current output data is at a Low level and next output data will be at a High level, as a correction target period, and the shift clock generator shortens a cycle of a shift clock corresponding to the Low-level output data and extends a cycle of a shift clock corresponding to the High-level output data.

6. The interface circuit according to claim 5, wherein the shift clock generator comprises:

a generator to generate a shift clock having a desired cycle by counting a basic clock according to a set value; and a setting section to set the set value generated by the generator, wherein the setting section changes the set value in the correction target period.

7. The interface circuit according to claim 1, wherein the transistor comprises an open-drain transistor.

8. The interface circuit according to claim 1, wherein the output data comprises serial data.

9. The interface circuit according to claim 1, wherein the shift clock generator changes the shift clock according to a width of the output of the data holding circuit.

10. The interface circuit according to claim 1, wherein the shift clock generator changes the cycle of the shift clock in a correction target period detected by the detector.

* * * * *